United States Patent [19]

Shimashita

[11] Patent Number: 5,661,642
[45] Date of Patent: Aug. 26, 1997

[54] SWITCHING POWER SUPPLY

[75] Inventor: Ishio Shimashita, Hadano, Japan

[73] Assignee: Ricoh Company, Ltd., Tokyo, Japan

[21] Appl. No.: 564,746

[22] Filed: Nov. 29, 1995

[30] Foreign Application Priority Data

Mar. 23, 1995 [JP] Japan .................. 7-064368

[51] Int. Cl.$^6$ .............................. H02M 3/335
[52] U.S. Cl. ................................ 363/21; 363/49
[58] Field of Search ................. 363/49, 21, 41; 323/901

[56] References Cited

U.S. PATENT DOCUMENTS 5,168,435 12/1992 Kobayashi et al. ............... 363/20
5,343,378 8/1994 Tohya ................................ 363/21

*Primary Examiner*—Peter S. Wong
*Assistant Examiner*—Shawn Riley
*Attorney, Agent, or Firm*—Lowe, Price, LeBlanc & Becker

[57] ABSTRACT

A switching power supply supplying power from an alternating-current power supply to a load includes a transformer having primary, secondary, and tertiary windings and a switching element, connected to the primary winding of the transformer, providing power from the alternating-current power supply to the primary winding. A control circuit controls the switching element to turn on and off. A supplementary power-supply circuit, connected to the tertiary winding of the transformer, provides output power to operate the control circuit. A start-up circuit is connected between one of output terminals of the alternating-current power supply and the supplementary power-supply circuit, and provides a current to the supplementary power-supply circuit to increase the output power of the supplementary power-supply circuit. In the switching power supply, when the output power of the supplementary power-supply circuit reaches a given value, the switching element is controlled to turn on and off, and power is generated in the secondary winding of the transformer and is provided to the load to be connected to the secondary winding.

4 Claims, 5 Drawing Sheets

5,661,642

SWITCHING POWER SUPPLY

BACKGROUND OF THE INVENTION

1. Field of the Invention

The present invention generally relates to a switching power supply, and more particularly, to a switching power supply which can be provided with a wide range of input voltage and can produce a large amount of load current by a supplementary power-supply circuit.

2. Description of the Related Art

At present, a variety of switching power supplies are proposed. A typical switching power supply comprises a transformer having primary, secondary, and tertiary windings, a supplementary power-supply circuit connected to the tertiary winding, and a control circuit operating by output power from the supplementary power-supply circuit. In the switching power supply, the control circuit controls a switching element connected with the primary winding to turn on and off, and power is supplied to a load connected with the secondary winding.

In the following, a description will be given of one example of a prior-art switching power supply, by referring to FIG. 1. FIG. 1 shows a schematic diagram of the one example of the prior art switching power supply.

In the prior-art switching power supply shown in FIG. 1, an alternating-current power supply 1 is connected to a primary-side rectifying-and-smoothing circuit 3 having a diode bridge 2 and an electrolytic capacitor C1. An output side of the primary-side rectifying-and-smoothing circuit 3 is connected to a primary winding N1 of a transformer 5 and to a switching element Q1 having, an FET through a snubber circuit 4 having serial and parallel circuits constructed with a capacitor C2, a resistor R1, and a diode D1. A secondary winding N2 of the transformer 5 is connected with an output terminal 7 of the switching power supply through a secondary-side rectifying-and-smoothing circuit 6 having a diode D2 and an electrolytic capacitor C3, the output terminal 7 being connected to a load device 8.

To a tertiary winding N3 of the transformer 5, a supplementary power-supply circuit 10 having a diode 3, a resistor R2, and an electrolytic capacitor C4 is connected. To the supplementary power-supply circuit 10, a pulse-width modulation (PWM) control circuit 11 controlling on-and-off of the switching element Q1 is connected. And also, a start-up circuit 12 whose input side is connected with the diode bridge 2 is connected to the supplementary power-supply circuit 10 for providing current thereto. The PWM control circuit 11 is connected to the switching element Q1 through a gate circuit 13, and is connected to the output terminal 7 through a feedback circuit 14. The feedback circuit 14 detects an output voltage of the output terminal 7, and feeds it back to the PWM control circuit 11. The feedback circuit 14 includes a photocoupler 15 whose photo-detection part and photo-radiation part are respectively connected to the PWM control circuit 11 and the output terminal 7, a Zener diode D4 constituting a shunt regulator, a capacitor C5, and resistors R3, R4, R5.

Next, an operation of the prior-art switching power supply will be discussed. In FIG. 1, when the alternating-current power supply 1 is turned on to supply the power, the alternating-current power is rectified to be a direct-current voltage in the primary-side rectifying-and-smoothing circuit 3. The direct-current voltage is applied to the transformer 5 and the switching element Q1. The direct-current voltage is also applied to the supplementary power-supply circuit 10 through the start-up circuit 12, and passes the resistor R2 and the diode D3 of the supplementary power-supply circuit 10. In the supplementary power-supply circuit 10, the electro-lytic capacitor C4 is charged by a pulsating start-up current from the start-up circuit 12. At this time, since an electric charge stored in the electrolytic capacitor C4 is prevented from discharging by the diode D3, a voltage across the electrolytic capacitor C4 increases. When the increased voltage of the supplementary power-supply circuit 10 reaches a start-up voltage of the PWM control circuit 11, the PWM control circuit 11 starts to operate.

An output signal of the PWM control circuit 11 controls an on-and-off operation of the switching element Q1 through the gate circuit 13. When the switching element Q1 turns on, a current flows through the primary winding N1 of the transformer 5, and energy is stored in the transformer 5. When the switching element Q1 turns off, the stored energy in the transformer 5 is transferred to the secondary winding N2 of the transformer 5, and is rectified to a direct-current voltage in the secondary-side rectifying-and-smoothing circuit 6. The direct-current voltage supplies power to the load device 8 from the output terminal 7. An output voltage of the output terminal 7 is detected in the feedback circuit 14, and is fed back to the PWM control circuit 11. By the PWM control circuit 11, the output voltage of the output terminal 7 is stably controlled to be a given voltage. Further, polarization of the tertiary winding N3 of the transformer 5 is set so that when the switching element Q1 turns on, the diode D3 connected in series to the tertiary winding N3 turns on to charge the electrolytic capacitor C4. And, a supplementary power-supply voltage Vcc substantially proportional to the input voltage is obtained.

In the prior-art supplementary power-supply circuit, when the PWM control circuit 11 is formed by an integrated circuit (IC), a rated voltage of the IC and a voltage between a gate and a drain of the switching element Q1 respectively have limits. In this case, the supplementary power-supply voltage Vcc needs to have a selection range of approximately 10 to 24 V. When an input voltage range of the power supply is relatively large, a varying range of the supplementary power-supply voltage may be over the selection range of 10 to 24 V. Therefore, an additional voltage regulator, for example, is necessary. Accordingly, the number of components increases, and, thus, cost of the switching power supply also increases. Further, when the input voltage is relatively large, the supplementary power-supply voltage is also large in proportion to the input voltage. Therefore, consumption power of the PWM control circuit 11 connected to the supplementary power-supply circuit 10 also increases. As a result, there is thus a problem in that overall transforming efficiency of the switching power supply is degraded.

To resolve the above problem, another method is proposed. In the method, in the switching power supply shown in FIG. 1, only the polarization of the tertiary winding N3 of the transformer 5 is reversed. In this case, when the switching element Q1 turns on, energy is stored in the transformer 5. And, when the switching element Q1 turns off, the diode D3 connected in series to the tertiary winding N3 turns on to charge the electrolytic capacitor C4. The supplementary power-supply voltage Vcc substantially proportional to the secondary-side output voltage is obtained.

In this method, even if the input voltage range of the power supply is relatively large, a varying range of the supplementary power-supply voltage may be reduced, and the IC for the PWM control circuit 11 may stably operate. However, even if the input voltage of the switching power supply is extremely small, the switching power supply continues to operate. At this time, the current flowing through the switching element Q1 increases in inverse proportion to the input voltage. Therefore, a power loss in the switching element Q1 increases and, as a result, the switching element Q1 is heated. When the PWM control circuit 11 cannot track the variation of the input voltage, unstable output voltage is produced to the output terminal 7. In this case, the unstable output voltage may cause error operations in fabricated devices and, in particular, the IC for the PWM control circuit 11.

Furthermore, in the prior-art supplementary power-supply circuit 10, the start-up circuit 12 for generating the start-up current of the supplementary power-supply circuit 10 is connected to a terminal outputting the direct-current voltage of the primary-side rectifying-and-smoothing circuit 3. Therefore, when trouble occurs in the switching power supply or the load device 8 and a protecting operation mode is set, even if the alternating-current power supply 1 is turned off, the current continues to flow through the PWM control circuit 11 because the electric charge remains in the primary-side rectifying-and-smoothing circuit 3. In this way, since the protecting operation mode is set, it takes a few minutes until the PWM control circuit 11 is reset. As a result, it takes a long time for an operation test, for example, of the switching power supply. The above problem may be resolved by an additional circuit forcibly resetting the PWM control circuit 11 when the alternating-current power supply 1 is turned off. However, by the additional circuit, the number of components increases, and the cost of the switching power supply may increase.

SUMMARY OF THE INVENTION

It is an object of the present invention to provide a switching power supply which rapidly resets a control circuit when an input alternating-current power supply is stopped. The switching power supply is usable for a wide range of variation of an input voltage. Further, a number of the components, size, and cost of the switching power supply may be reduced. This permits the disadvantages described above to be eliminated.

The object described above is achieved by a switching power supply supplying power from an alternating-current power supply to a load, the switching power supply comprising: a transformer having primary, secondary, and tertiary windings; a switching element, connected to the primary winding of the transformer, providing power from the alternating-current power supply to the primary winding; a control circuit controlling the switching element to turn on and off; a supplementary power-supply circuit, connected to the tertiary winding of the transformer, providing output power to operate the control circuit; and a start-up circuit, connected between one of output terminals of the alternating-current power supply and the supplementary power-supply circuit, providing a current to the supplementary power-supply circuit to increase the output power of the supplementary power-supply circuit; wherein when the output power of the supplementary power-supply circuit reaches a given value, the switching element is controlled to turn on and off, and power is generated in the secondary winding of the transformer and is provided to the load to be connected to the secondary winding.

According to the above-mentioned switching power supply, the current of the start-up circuit can be directly provided from the alternating-current power supply. Therefore, when the alternating-current power supply is turned off, the current in the control circuit may be stopped by the supplementary power-supply circuit.

The object described above is also achieved by the switching power supply mentioned above, wherein the switching power supply further comprises a diode for blocking a reverse current, which diode is connected in series between the start-up circuit and the one of the output terminals of the alternating-current power-supply.

According to the above-mentioned switching power supply, by only providing the diode for blocking the reverse current, the current from the supplementary power-supply circuit is positively prevented from flowing back to the start-up circuit.

The object described above is also achieved by the switching power supply mentioned above, wherein the supplementary power-supply circuit comprises: a first rectifying circuit, connected to one of terminals of the tertiary winding of the transformer, having a capacitor, a resistor, and a first diode; and a second rectifying circuit having a second diode which is operative to charge the capacitor in an opposite direction when polarization of the transformer is reversed.

According to the above-mentioned switching power supply, even if the input voltage varies, a variation range of the output power of the supplementary power-supply circuit may be reduced. Therefore, when the input voltage drops down, the output power of the supplementary power-supply circuit may also be reduced according to the input voltage.

The object described above is also achieved by the switching power supply mentioned above, wherein the switching power supply further comprises a resistor connected to an output terminal of the control circuit.

According to the above-mentioned switching power supply, when an on-time period of the switching element increases due to, for example, the drop down of the input voltage, effective current flowing through the resistor increases to decrease the output power of the supplementary power-supply circuit. Therefore, when trouble occurs in the alternating-current power supply, the switching operation of the switching power supply may positively be stopped.

Other objects and further features of the present invention will be apparent from the following detailed description when read in conjunction with the accompanying drawings.

DESCRIPTION OF THE PREFERRED EMBODIMENTS

Figure 1:
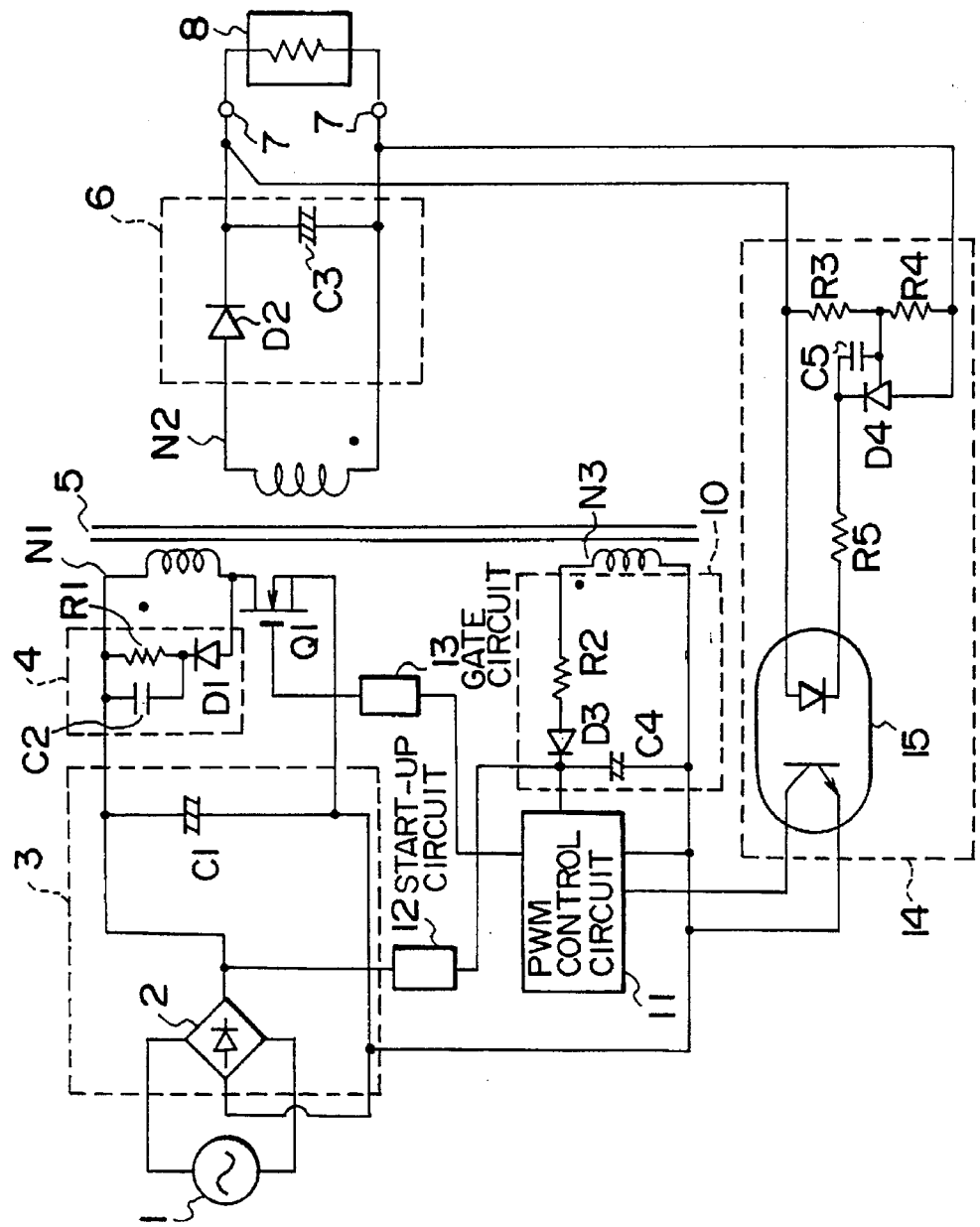
FIG. 1 shows a schematic diagram of one example of a prior-art switching power supply.
Figure 2:
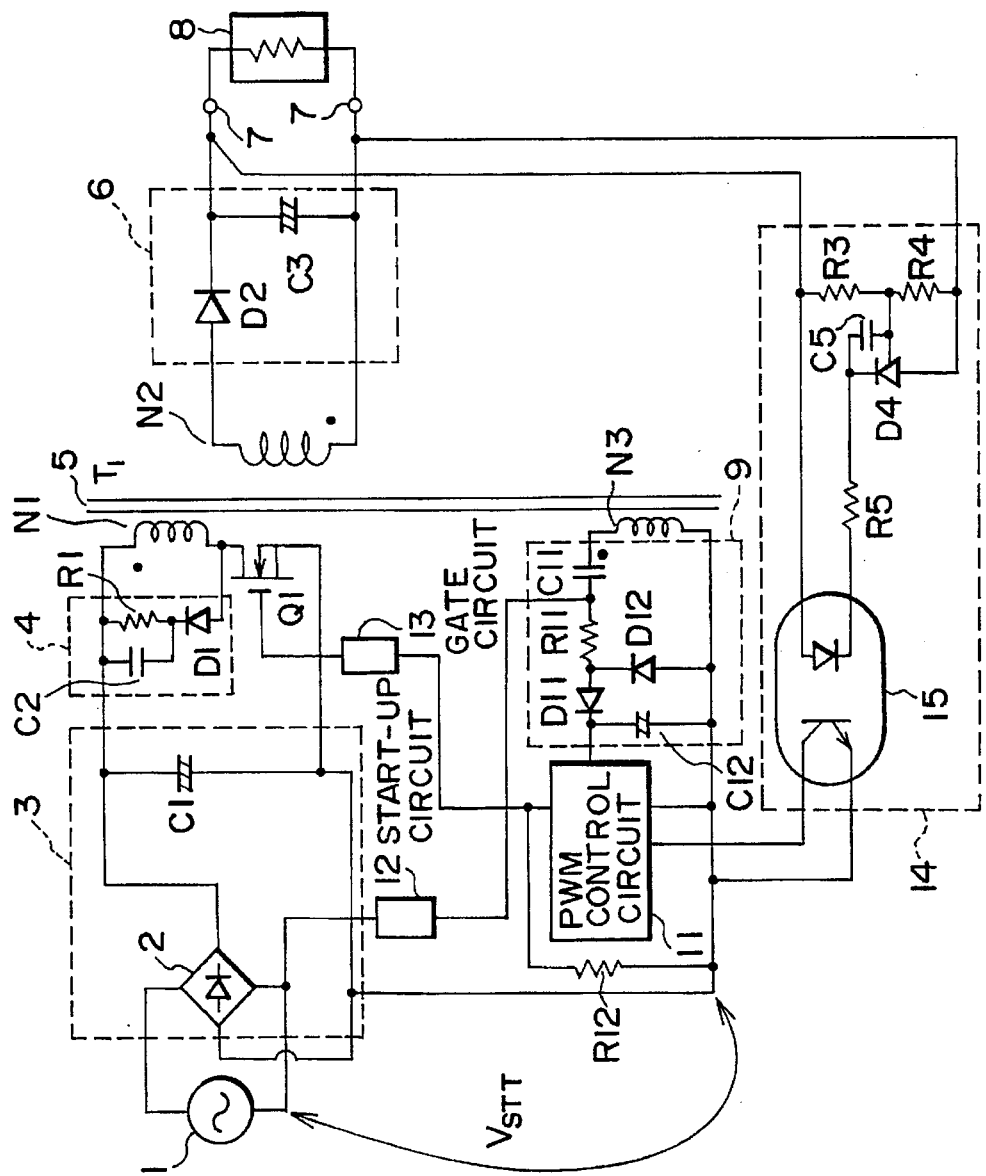
FIG. 2 shows a schematic diagram of a first embodiment of a switching power supply according to the present invention.
Figure 3:
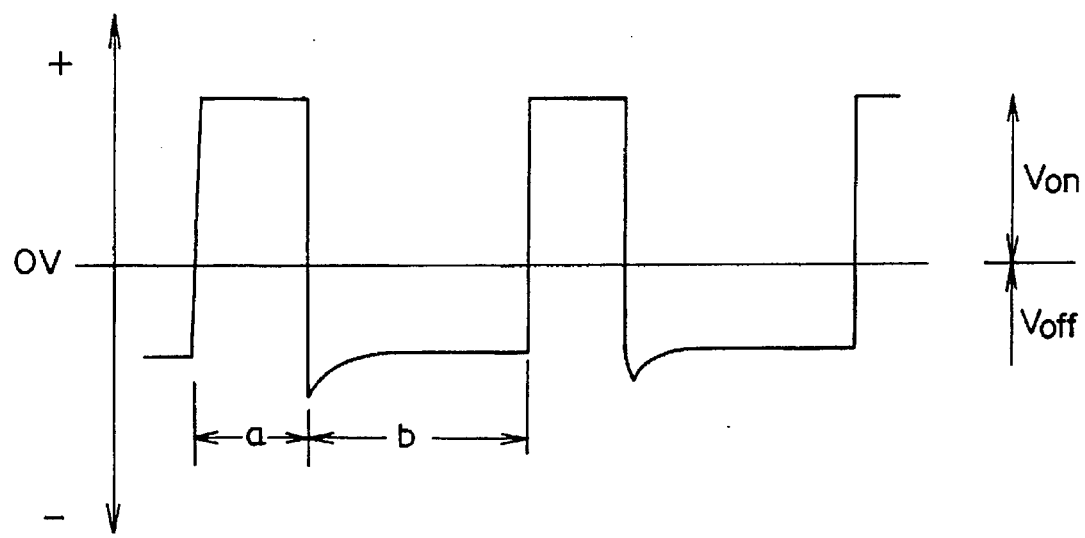
FIG. 3 shows a graphical representation of a voltage generated in a tertiary winding of a transformer.
Figure 4:
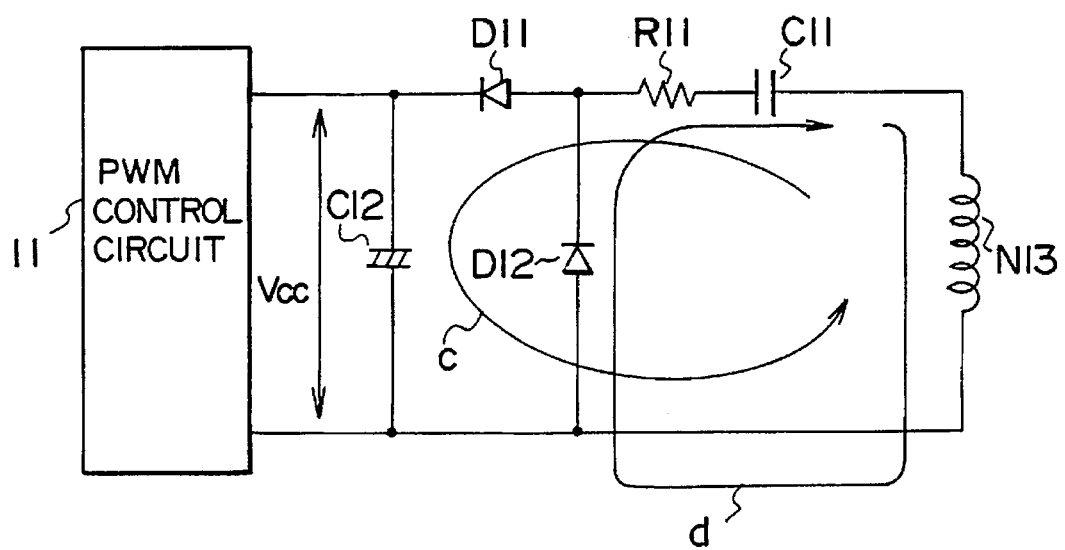
FIG. 4 shows a schematic diagram for explaining a current path in a supplementary power-supply circuit.
Figure 5:
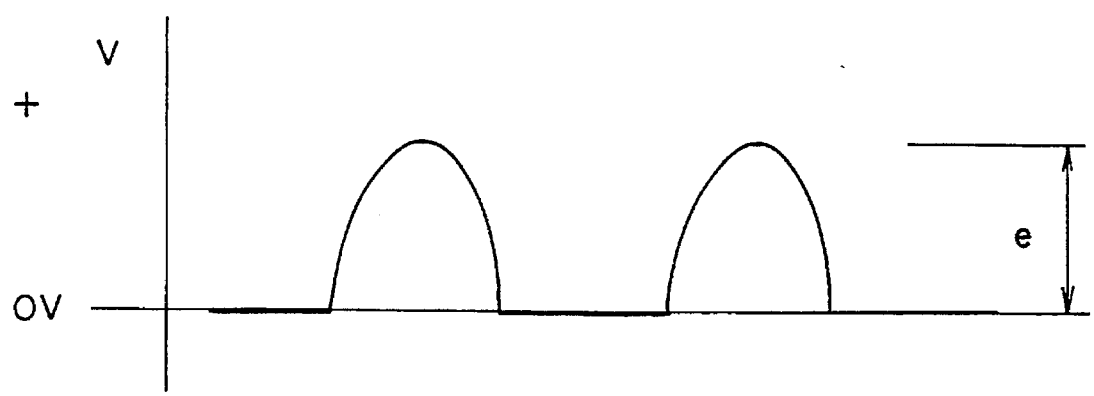
FIG. 5 shows an output waveform of a start-up circuit.

First, a description will be given of a first embodiment of a switching power supply according to the present invention, by referring to FIG. 2 to FIG. 5. FIG. 2 shows a schematic diagram of the first embodiment of the switching power supply according to the present invention. Elements in FIG. 2 which are the same as those of FIG. 1 are given the same reference numerals. FIG. 3 shows a graphical representation of a voltage generated in a tertiary winding of a transformer. FIG. 4 shows a schematic diagram for explaining a current path in a supplementary power-supply circuit. FIG. 5 shows an output waveform of a start-up circuit.

In the following, descriptions of the same operations as described in FIG. 1 will be omitted, only differences will given. In the first embodiment of the switching power supply shown in FIG. 2, the primary-side rectifying-and-smoothing circuit 3, the transformer 5, the secondary-side rectifying-and-smoothing circuit 6, the PWM control circuit 11, and the gate circuit 13 have respectively the same circuit configurations as those shown in FIG. 1.

A supplementary power-supply circuit 9 shown in FIG. 2 includes a series circuit of a capacitor C11, a resistor R11, and a diode D11, an electrolytic capacitor C12 connected between an output side of the diode D11 and a negative side of the tertiary winding N3, and a diode D12 connected between a connection point between the resistor R11 and the diode D11 and the negative side of the tertiary winding N3. Namely, the supplementary power-supply circuit 9 has a first rectifying circuit and a second rectifying circuit. The first rectifying circuit is constructed with the capacitor C11, the resistor R11, and the diode D11 connected to the tertiary winding N3 of the transformer 5. The second rectifying circuit is constructed with the diode D12, which reversely charges the capacitor C11 when the polarization of the transformer 5 is reversed.

The start-up circuit 12 shown in FIG. 2 is connected to a connection point between the capacitor C11 and the resistor R11 and to one of terminals of the alternating-current power supply 1. The start-up circuit 12 may be easily constructed with only resistors, or may be a series circuit of resistors and voltage-dependent semiconductor devices (not shown). The voltage-dependent semiconductor devices may include a Zener diode, a varistor, or an avalanche diode, etc., through which a current flows when more than a given voltage is applied. Further, an IC combining such voltage-dependent semiconductor devices with an active device such as a transistor, an FET, or a thyristor is also usable. Further, to a connection point between the output terminal of the PWM control circuit 11 and the gate circuit 13, a resistor R12 is connected in parallel to the PWM control circuit 11.

In the first embodiment, in the same way as that of the prior-art switching power supply shown in FIG. 1, when the alternating-current power supply 1 is turned on to supply the power, the alternating-current power is rectified to be a direct-current voltage in the primary-side rectifying-and-smoothing circuit 3. The direct-current voltage is applied to the transformer 5 and the switching element Q1. The direct-current voltage is also applied to the supplementary power-supply circuit 9 through the start-up circuit 12, and passes the resistor R11 and the diode D11 of the supplementary power-supply circuit 9. In the supplementary power-supply circuit 9, the electrolytic capacitor C12 is charged by a pulsating start-up current from the start-up circuit 12, and a voltage across the electrolytic capacitor C12 increases. When the increased voltage of the supplementary power-supply circuit 9 reaches the a start-up voltage of the PWM control circuit 11, the PWM control circuit 11 starts to operate.

The output signal of the PWM control circuit 11 controls an on-and-off operation of the switching element Q1 through the gate circuit 13. When the switching element Q1 turns on, a current flows through the primary winding N1 of the transformer 5, and energy is stored in the transformer 5. When the switching element Q1 turns off, the stored energy in the transformer 5 is transferred to the secondary winding N2 of the transformer 5, and is rectified to a direct-current voltage in the secondary-side rectifying-and-smoothing circuit 6. The direct-current voltage supplies power to the load device 8 from the output terminal 7.

In the following, an operation of the supplementary power-supply circuit 9 will be discussed in detail. When the switching element Q1 operates by turning on and off, as shown in FIG. 3, a rectangular-wave voltage is generated in the tertiary winding N3 of the transformer 5 according to the on-and-off operation of the switching element Q1. In FIG. 3, a time period "a" represents an on time of the switching element Q1, and a time period "b" represents an off time of the switching element Q1.

When the switching element Q1 turns on, as shown in FIG. 4, a current "c" flows through the capacitor C11, the resistor R11, and the diode D11 in that order, and charges the electrolytic capacitor C12. When the switching element Q1 turns off, a current "d" flows through the resistor R11 and the capacitor C11 in that order, and stores energy in the capacitor C11. Next, when the switching element Q1 turns on again, the voltage across the capacitor C11 is added to the voltage across the tertiary winding N3 of the transformer 5, a total of both voltages is used for charging the electrolytic capacitor C12 through the capacitor C11, the resistor R11 and the diode D11.

In FIG. 4, a voltage generated across the electrolytic capacitor C12 indicates a supplementary power-supply voltage Vcc which is the same as a power-supply voltage for the PWM control circuit 11. In the above-mentioned operation, the supplementary power-supply voltage Vcc is shown in the following equation.

$$Vcc=Von+Voff, \qquad (1)$$

where Von is the voltage across the tertiary winding N3 of the transformer 5 which is generated when the electrolytic capacitor C12 turns on, and Voff is the voltage across the tertiary winding N3 of the transformer 5 which is generated when the electrolytic capacitor C12 turns off. The voltage Von is proportional to an input voltage Vin of the primary-side rectifying-and-smoothing circuit 3, and is represented as follows:

$$Von=(n3/n1){\times}Vin, \qquad (2)$$

where n3 and n1 are the number of turns in the third and primary windings, N3, N1, respectively. And, Voff is proportional to an output voltage Vout in the output terminal 7 which is an output voltage of the switching power supply, and is represented as follows:

$$Voff=(n3/n2){\times}Vout, \qquad (3)$$

where n2 is the number of turns in the secondary winding N2.

When substituting the equations (2), (3) to the equation (1), the following equation (4) is given.

$$Vcc=[(n3/n1){\times}Vin]+[(n3/N2){\times}Vout] \qquad (4)$$

As indicated in the equation (4), the supplementary power-supply voltage Vcc has features of both the Von which is substantially proportional to the input voltage Vin and the Voff which is substantially proportional to the output voltage Vout. As a result, the supplementary power-supply voltage Vcc varies in relation to the input voltage Vin, and a variation range of the supplementary power-supply voltage may be reduced. Further, as indicated in the equation (4), both of positive voltage and negative voltage generated across the tertiary winding N3 of the transformer 5 are used for the supplementary power-supply voltage. Therefore, the voltage to be generated across the tertiary winding N3 may be reduced, and, thus, the number of turns of the tertiary winding N3 may also be reduced. As a result, for the diodes D11, D12, diodes rated at a small inverse voltage are usable.

The resistor R11 has a function of limiting the current flowing through the capacitors C11, C12. Though an extremely small portion of the supplementary power-supply voltage cannot be adjusted by selecting the winding ratio of the transformer 5, such adjustment of the supplementary power-supply voltage may easily be performed by selecting a resistance of the resistor R11. Furthermore, in this embodiment, voltage variation of the supplementary power-supply voltage due to a duty ratio of the on-and-off operation of the switching element Q1 may be reduced. In this embodiment, when the above-mentioned functions are not necessary, the resistor R1 may be eliminated.

In the start-up circuit 12 providing current to the supplementary power-supply circuit 9, one end of the start-up circuit 12 is connected to one of the terminals of the alternating-current power supply 1. Therefore, between the alternating-current power supply 1 and a common side (a negative side) of the supplementary power-supply circuit 9, by the rectifying operation of the primary-side rectifying-and-smoothing circuit 3, as shown in FIG. 5, a pulsating voltage which is given by half-wave rectifying the voltage of the alternating-current power supply 1 is generated, and is applied to the supplementary power-supply circuit 9. A maximum voltage "e" of the rectified half-wave is identical to a peak voltage of the alternating-current power supply 1.

The other end of the start-up circuit 12 is connected between the diode D11 and the capacitor C11 of the supplementary power-supply circuit 9. In this embodiment, capacitance of the capacitor C11 is set to sufficiently less than that of the capacitor C12. Therefore, due the capacitor C12, a current path to the tertiary winding N3 of the transformer 5 is blocked, and, thus, the pulsating voltage charges the capacitor C12 through the diode D11. When no pulsating voltage is generated, the diode D11 prevents the capacitor C12 from being discharged.

In this way, a charging current to the capacitor C12 is restricted by the start-up circuit 12. In this case, the capacitor C12 is gradually charged, and, thus, the voltage of the supplementary power-supply circuit 9 increases at a slow pace. When the voltage Vcc across the capacitor C12 is greater than the start-up voltage for the PWM control circuit 11, the PWM control circuit 11 starts to operate, and produces the PWM signal to control the on-and-off operation of the switching element Q1.

In the following operation, the supplementary power-supply voltage is supplied from the tertiary winding N3 of the transformer 5. Therefore, the current supplied from the start-up circuit 12 has no influence on the overall operation of the switching power supply. Further, since the capacitance of the capacitor C11 is set to be sufficiently less than that of the capacitor C12, the start-up current shunted to the capacitor C11 may be reduced. Accordingly, with such a small start-up current, it is possible to positively start up the PWM control circuit 11.

In this way, the current for the start-up circuit 12 is directly derived from the alternating-current power supply 1. As a result, even when a protection circuit (not shown) included in the PWM control circuit 11 is activated to keep the protection mode, the current of the PWM control circuit 11 may be stopped by turning off the alternating-current power supply 1. Therefore, even if electric charge remains in the primary-side rectifying-and-smoothing circuit 3, the PWM control circuit 11 may rapidly be reset.

Further, when the start-up circuit 12 is constructed with only resistors, a configuration of the start-up circuit 12 may be extremely simplified, and a cost thereof may be reduced. And, when the start-up circuit 12 is constructed with the voltage-depended semiconductor devices and the resistors, the PWM control circuit 11 may not start up for the input voltage less than the voltage which is determined by the voltage-dependent semiconductor devices and the PWM control circuit 11. As a result, an error operation occurring due to an incorrect input of a low voltage and trouble in the alternating-current power supply 1 may be prevented, and, thus, reliability of the fabricated devices may be improved.

In the first embodiment, the resistor R12 is connected to the output terminal of the PWM control circuit 11.

Therefore, when the on-time period of the switching element Q1 increases due to, for example, a decrease of the input voltage, an effective current flowing through the resistor R12 increases and the supplementary power-supply voltage decreases. In this way, at the trouble condition of the alternating-current power supply 1, the switching operation may be positively stopped.

Figure 6:
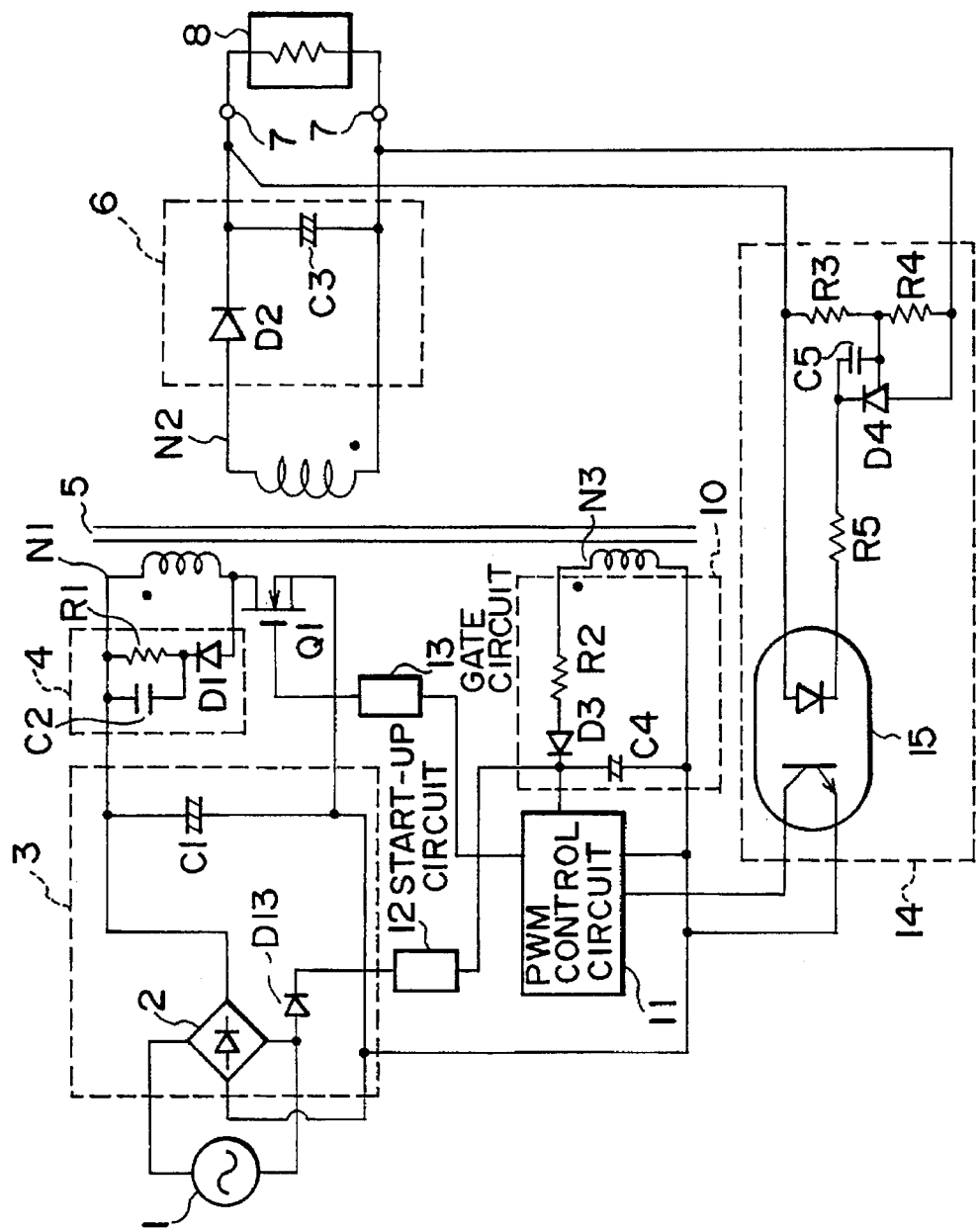
FIG. 6 shows a schematic diagram of a second embodiment of a switching power supply according to the present invention.

Next, a description will be given of a second embodiment of a switching power supply according to the present invention, by referring to FIG. 6. FIG. 6 shows a schematic diagram of the second embodiment of the switching power supply according to the present invention. Elements in FIG. 6 which are the same as those of FIG. 1 are Given the same reference numerals. In the second embodiment shown in FIG. 6, a diode D13 blocking a reverse current is connected to the start-up circuit 12 in series, and a positive side of the diode D13 is connected to the one terminal of the alternating-current power supply 1. Remaining circuit configuration is the same as that of the prior-art switching power supply shown in FIG. 1.

In the second embodiment, to the start-up circuit 12, in the same way as the first embodiment shown in FIG. 2, the pulsating voltage is applied. The pulsating voltage charges the capacitor 4 in the supplementary power-supply circuit 10. When no pulsating voltage is generated, the diode D13 prevents the capacitor C4 from being discharged. A charging current to the capacitor C4 is restricted by the start-up circuit 12. Therefore, the capacitor C4 is gradually charged, and the voltage across the capacitor C4 increases at a slow pace.

When the voltage across the capacitor C4 reaches the start-up voltage of the PWM control circuit 11, in the same way as for the prior art shown in FIG. 1 and for the first embodiment shown in FIG. 2, the PWM control circuit 11 starts to control the on-and-off operation of the switching element Q1. As a result, the supplementary power-supply voltage is supplied to the load device 8 from the tertiary winding N3 of the transformer 5. In this way, by only providing the diode D13 for blocking the reverse current, the current for the start-up circuit 12 may be directly provided from the alternating-current power supply 1. Therefore, even when the protection circuit of the PWM control circuit 11 is activated to keep the protection mode, the PWM control circuit 11 may be rapidly reset by turning off the alternating-current power supply 1.

In the above-mentioned first and second embodiments, the polarization of the tertiary winding N3 of the transformer 5 is set to that of a forward winding in which a positive voltage is generated when the switching element Q1 turns on. However, even if the polarization of the tertiary winding N3 is set to that of a flyback winding in which a negative voltage is generated when the switching element Q1 turns on, the same supplementary power-supply voltage may be obtained as indicated in the equation (1).

In the switching power supplies of the first and second embodiments, a flyback converter technology (on-off converter technology) is used. However, the present invention is not limited to this technology, but is also applicable to the switching power supply using a forward converter technology (on-on converter technology). In the on-on converter technology, when the switching element turns on, the energy is transferred to the secondary-side of the transformer. At this time, since the Voff in the equation (1) becomes a reset voltage of the transformer, the Voff is not proportional to the output voltage. However, the stable output voltage may still be produced.

As described above, the present invention has the following features.

In the switching power supply according to the present invention, the supplementary power-supply circuit is connected to the one of the output terminals of the alternating-current power supply through the start-up circuit. In the circuit configuration, the current of the start-up circuit can be directly provided from the alternating-current power supply. Therefore, when the alternating-current power supply is turned off, the current in the control circuit may also be stopped by the supplementary power-supply circuit. Accordingly, even if the rectifying-and-smoothing circuit having remaining electric charge is provided, when the switching element Q1 turns from on to off, the control circuit may rapidly be reset.

In the switching power supply according to the present invention, by only the diode for blocking the reverse current being provided, the current from the supplementary power-supply circuit is positively prevented from flowing back to the start-up circuit.

Further, in the switching power supply according to the present invention, even if the input voltage varies, the variation range of the output power of the supplementary power-supply circuit may be reduced. Therefore, it is unnecessary to add, for example, a regulator, for stabilizing the output voltage of the supplementary power-supply circuit. Further, when the input voltage drops down, the output power of the supplementary power-supply circuit may also be reduced according to the input voltage. Therefore, by providing a voltage detection function in the control circuit, the switching operation may be stopped when the output voltage of the supplementary power-supply circuit extremely drops down.

Still further, in the switching power supply according to the present invention, when the on-time period of the switching element increases due to, for example, the drop down of the input voltage, the effective current flowing through the resistor increases to decrease the output power of the supplementary power-supply circuit. Therefore, when trouble occurs in the alternating-current power supply, the switching operation of the switching power supply may positively be stopped.

Further, the present invention is not limited to these embodiments, but other variations and modifications may be made without departing from the scope of the present invention.

What is claimed is:

1. A switching power supply supplying power from an alternating-current power supply to a load, said switching power supply comprising:

a diode bridge circuit having input terminals connected to output terminals of said alternating current supply and having output terminals;

a transformer having primary, secondary, and tertiary windings;

a switching element, connected to said primary winding of the transformer, providing power from said alternating-current power supply to the primary winding;

a control circuit controlling said switching element to turn on and off;

a supplementary power-supply circuit, connected to said tertiary winding of the transformer, providing output power to operate said control circuit;

a start-up circuit, connected between one of the input terminals of said diode bridge circuit and said supplementary power-supply circuit to increase said output power of the supplementary power-supply circuit; and a reverse current blocking diode connected in series between said start-up circuit and the input terminal of said diode bridge circuit;

wherein current from the supplementary power-supply circuit is positively prevented from flowing back to the start-up circuit by the blocking diode, thereby providing current to the start-up circuit directly from the alternating-current power supply, and rapidly resetting said control circuit when said alternating-current power supply is turned off.

2. The switching power supply as claimed in claim 1, wherein said switching power supply further comprises a resistor connected to an output terminal of said control circuit.

3. A switching power supply supplying power from an alternating-current power supply to a load, said switching power supply comprising:

a transformer having primary, secondary, and tertiary windings;

a switching element, connected to said primary winding of the transformer, providing power from said alternating-current power supply to the primary winding;

a control circuit controlling said switching element to turn on and off;

a supplementary power-supply circuit, connected to said tertiary winding of the transformer, providing output power to operate said control circuit; and a start-up circuit, connected between one of the output terminals of said alternating-current power supply and said supplementary power-supply circuit, providing a current to said supplementary power-supply circuit to increase said output power of the supplementary power-supply circuit;

wherein when said output power of the supplementary power-supply circuit reaches a given value, the switching element is controlled to turn on and off, and power is generated in said secondary winding of the transformer and is provided to said load to be connected to the secondary winding wherein said supplementary power-supply circuit comprises:

a first capacitor coupled to said control circuit;

a first rectifying circuit, connected to one of the terminals of said tertiary winding of the transformer, having a second capacitor, a resistor, and a first diode coupled to said first capacitor; and a second rectifying circuit having a second diode which is operative to charge said second capacitor in an opposite direction when polarization of the transformer is reversed.

4. The switching power supply as claimed in claim 3, wherein said switching power supply further comprises a resistor connected to an output terminal of said control circuit.

* * * * *